US010518965B2

(12) United States Patent
Garcin et al.

(10) Patent No.: US 10,518,965 B2
(45) Date of Patent: Dec. 31, 2019

(54) COFFEE CAPSULE AND SYSTEM FOR PRODUCING A COFFEE EXTRACT WITH SUCH CAPSULE

(71) Applicant: Nestec S. A., Vevey (CH)

(72) Inventors: Karine Garcin, Cortaillod (CH); Sébastien Pelletier, Les Fourgs (FR); Arnaud Gerbaulet, Oye et Pallet (FR); Jean-Marc Flick, Pomy (CH); Daniel Abegglen, Grandvaux (CH); Viviane Rebelo, Malbuisson (FR)

(73) Assignee: Societe des Produits Nestle S.A., Vevey (CH)

( * ) Notice: Subject to any disclaimer, the term of this patent is extended or adjusted under 35 U.S.C. 154(b) by 232 days.

(21) Appl. No.: 15/120,918

(22) PCT Filed: Feb. 16, 2015

(86) PCT No.: PCT/EP2015/053171
§ 371 (c)(1),
(2) Date: Aug. 23, 2016

(87) PCT Pub. No.: WO2015/144356
PCT Pub. Date: Oct. 1, 2015

(65) Prior Publication Data
US 2016/0362246 A1 Dec. 15, 2016

(30) Foreign Application Priority Data
Mar. 24, 2014 (EP) ..................................... 14161240

(51) Int. Cl.
*A47J 31/36* (2006.01)
*A47J 31/40* (2006.01)
(Continued)

(52) U.S. Cl.
CPC .......... *B65D 85/8043* (2013.01); *A23F 5/262* (2013.01); *A47J 31/0673* (2013.01); *A47J 31/407* (2013.01); *B65D 1/26* (2013.01)

(58) Field of Classification Search
CPC .... B65D 85/8043–8046; A47J 31/3676–3695; A47J 31/407; A23F 5/262–265
See application file for complete search history.

(56) References Cited

U.S. PATENT DOCUMENTS

| 5,402,707 A | 4/1995 | Fond |
| 7,604,826 B2 * | 10/2009 | Denisart ............ B65D 85/8043 426/112 |

(Continued)

FOREIGN PATENT DOCUMENTS

| EP | 2287090 A1 | 2/2011 |
| EP | 2476633 A1 | 7/2012 |

OTHER PUBLICATIONS

International Search Report, dated Mar. 25, 2015, in PCT/EP2015/053171, filed Feb. 16, 2015.
(Continued)

*Primary Examiner* — Michael A Laflame, Jr.
(74) *Attorney, Agent, or Firm* — K&L Gates LLP

(57) ABSTRACT

A single-use coffee capsule is disclosed that has a cup-shaped body and an extraction foil member for the preparation of a liquid coffee extract in a coffee preparation apparatus. Also disclosed is a system that includes the capsule and the coffee preparation apparatus. Further disclosed are methods of making and using the capsule and system.

19 Claims, 5 Drawing Sheets

(51) Int. Cl.
*B65D 85/804* (2006.01)
*A47J 31/06* (2006.01)
*A23F 5/26* (2006.01)
*B65D 1/26* (2006.01)

(56) References Cited

U.S. PATENT DOCUMENTS

| | | | |
|---|---|---|---|
| 2007/0141215 A1* | 6/2007 | Bunke | A23F 5/262 426/433 |
| 2009/0223373 A1 | 9/2009 | Kollep et al. | |
| 2009/0235827 A1* | 9/2009 | Bongers | B65D 85/8043 99/316 |
| 2010/0062127 A1* | 3/2010 | Bongers | B65D 85/8043 426/431 |
| 2010/0178404 A1* | 7/2010 | Yoakim | A47J 31/22 426/431 |
| 2011/0020500 A1 | 1/2011 | Eichler et al. | |
| 2011/0064852 A1* | 3/2011 | Mann | B65D 85/8043 426/78 |
| 2011/0271844 A1* | 11/2011 | Mariller | A47J 31/0673 99/295 |
| 2012/0121765 A1* | 5/2012 | Kamerbeek | A47J 31/0673 426/77 |
| 2012/0263829 A1* | 10/2012 | Kamerbeek | A47J 31/0673 426/77 |
| 2012/0308691 A1 | 12/2012 | Alvarez et al. | |
| 2013/0243910 A1* | 9/2013 | Kruger | B65D 85/8043 426/115 |
| 2014/0037803 A1* | 2/2014 | Hansen | B65D 85/8043 426/115 |
| 2014/0065269 A1* | 3/2014 | Favre | A47J 31/0673 426/112 |
| 2014/0196608 A1* | 7/2014 | Amrein | B65D 85/8043 99/295 |
| 2014/0348984 A1* | 11/2014 | Zeller | B65D 85/8043 426/115 |

OTHER PUBLICATIONS

Written Opinion of the International Searching Authority, dated Mar. 25, 2015, in PCT/EP2015/053171, filed Feb. 16, 2015.

* cited by examiner

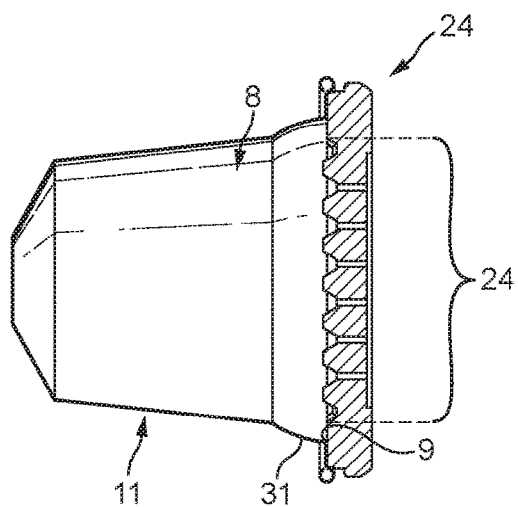
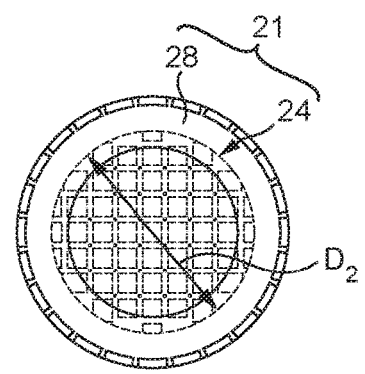
FIG. 6    FIG. 7
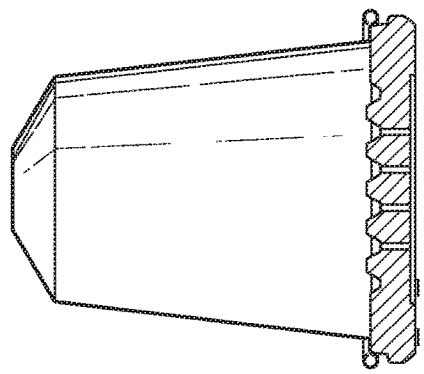
FIG. 8

COFFEE CAPSULE AND SYSTEM FOR PRODUCING A COFFEE EXTRACT WITH SUCH CAPSULE

CROSS REFERENCE TO RELATED APPLICATIONS/INCORPORATION BY REFERENCE STATEMENT

This application is a U.S. national stage application filed under 35 USC § 371 of International Application No. PCT/EP2015/053171, filed Feb. 16, 2015; which claims priority to Application No. EP 14161240.8, filed Mar. 24, 2014. The entire contents of the above-referenced application are hereby expressly incorporated herein by reference.

TECHNICAL FIELD

The presently disclosed and/or claimed inventive concept(s) relates to the area of coffee extraction from a coffee preparation apparatus using coffee capsules. The presently disclosed and/or claimed inventive concept(s) more particularly relates to a coffee capsule and to a system comprising a coffee capsule and a coffee preparation apparatus.

BACKGROUND

A system for preparing a liquid coffee extract of relatively small volume such as ristretto, espresso or lungo, from a single-use capsule containing roast and ground coffee powder in a high-pressure extraction apparatus is known.

One of the most successful coffee capsule system (e.g., Nespresso® coffee system) and commercialized for many years, comprises a single-use coffee capsule with a tearable extraction foil member, a cup-shaped body comprising a cavity containing a predetermined amount of roast and ground coffee and closed by the foil member.

For the preparation of the coffee extract, the capsule is received in an extraction chamber of the apparatus. The chamber is generally formed by the arrangement of a water injection cage and an extraction plate closing about the capsule. The perforation of outlet orifices for draining the coffee extract from the capsule is, in certain non-limiting embodiments, obtained under the effect of the pressure of liquid which is injected inside the capsule for pressing and tearing or stretching the foil member against the tearing portion of the extraction plate. For this, the capsule extraction plate comprises truncated pyramids (in relief) and a network of flow channels (in recess). The capsule has a thin, flexible foil member (hereafter referred as "tearable foil member") such as aluminium which tears or stretch under a pressure of several bar and at a plurality of locations, in particular along the edges of the truncated pyramids, forming small filtering orifices for the coffee extract to flow through. The coffee extract is further drained via small holes provided in the flow channels and through the extraction plate.

The existing coffee capsules have generally a volume adapted for containing a limited amount of coffee but suitable for producing under pressure short coffee extracts within a wide range of intensity and different sensory (flavour or aromatic) profiles. Many different coffee related factors can potentially vary the intensity and/or flavour of the coffee extract, in particular, the coffee weight, the granulometry (grind size, size distribution, percentage of fine particles), bean roasting degree, compaction, coffee origin, coffee blends. Also, many system related factors may also influence the intensity and flavour of the coffee extract such as the correlated parameters of pressure/flow rate, the water volume, etc.

In the small available volume of the existing capsule used in the coffee high-pressure apparatus, the weight of coffee it may contain cannot exceed 6.5 grams. Above this limit, the coffee powder becomes too compacted and this may create preferential path for liquid and/or blocking. As a result, the coffee extraction is not optimal and/or the liquid coffee flow can be too slow and is often blocked before the end of the coffee extraction.

Also, with a higher weight of coffee powder for preparing a relatively short coffee, more undesired coffee compounds can be extracted and/or off-flavour notes can be generated.

Therefore, there is a need for providing more intense and/or more aromatically complex coffee extracts using the extraction principle known while limiting extraction of undesired coffee compounds and/or generating off-flavour notes.

BRIEF DESCRIPTION OF THE FIGURES

FIG. 6 is a cross-sectional view of the capsule of the presently disclosed and/or claimed inventive concept(s) along the median longitudinal plan of the presently disclosed and/or claimed inventive concept(s) when engaged by an extraction plate with a larger tearing surface area of the apparatus (referred hereafter as "Large" extraction plate).

FIG. 7 is a planar view of the "Large" extraction plate of the apparatus.

FIG. 8 is a cross-sectional view of an alternative capsule (not recognized here as part of the prior art) along the median longitudinal plan of the presently disclosed and/or claimed inventive concept(s) when engaged by a "Small" extraction plate of the apparatus.

DETAILED DESCRIPTION

Figure 1:
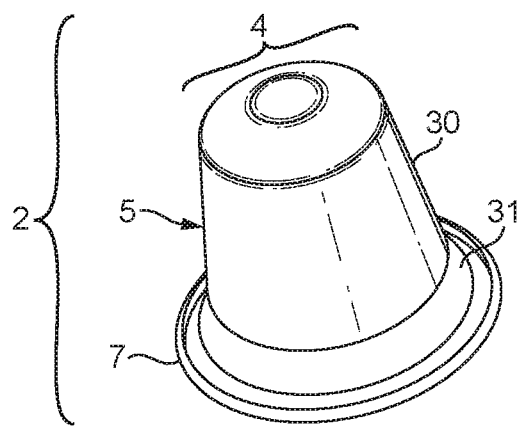
FIG. 1 is a perspective view of a large-volume coffee capsule of the presently disclosed and/or claimed inventive concept(s).

The presently disclosed and/or claimed inventive concept(s) relates to single-use coffee capsule with a tearable extraction foil member for the preparation of a liquid coffee extract in a coffee preparation apparatus comprising an extraction unit comprising an extraction chamber formed by the arrangement of a water injection cage for injecting water in the capsule and a capsule extraction plate comprising a tearing portion of tearing surface area A2 with a plurality of tearing members for creating coffee flow orifices in the extraction foil member under the effect of the pressure of fluid in the capsule;

said capsule comprising:
- a cup-shaped body comprising a cavity containing a predetermined amount of roast and ground coffee; said cavity being defined by a bottom wall and a substantially tubular side wall; the side wall ending by a cavity opening delimited by an internal peripheral edge of the side wall in the direction opposed to the bottom wall,
- an annular flange extending outwardly from the said internal edge of the side wall, and
- a lid covering the opening being at least partially formed by the tearable extraction foil member;

wherein
- the cavity of the capsule contains at least 6.9 grams of roast and ground coffee, such as (but not limited to) from 7.0 to 12.0 grams of roast and ground coffee, or from 7.5 to 10.5 grams and,
- the cavity opening is arranged to have an opening surface area A1, measured at said internal peripheral edge, such that the ratio of the area A1 relative to the tearing portion surface area A2 of the extraction plate of the apparatus, is at least of 2.0, such as (but not limited to) comprised between 2.1 and 2.5, or 2.2 and 2.4, or about 2.3.

In particular, compared to prior art capsules, the volume of the capsule is increased to allow a greater amount of coffee to be received in the capsule without excessive compaction of the powder, while at the same time the surface area of the foil member relative to the extraction plate which is allocated for tearing and so producing coffee flow orifices is reduced. These relations unexpectedly improved in-cup coffee results.

It was surprisingly found that the capsule of the presently disclosed and/or claimed inventive concept(s) provides more intense and/or more complex coffee extracts, possibly denser foam compared to existing capsules containing lower coffee weight.

Coffee undesired compounds in the coffee extracts were also found to be lower than with other possible alternative large-volume capsules.

In an aspect, the cavity opening is configured to have a substantially circular outer limit or circumference limited by an internal peripheral edge and to have a diameter D1, measured at the internal peripheral edge, such that the ratio of the opening cavity diameter D1 relative to a circular tearing portion of the diameter D2 capsule extraction plate, i.e., D1:D2, is at least of 1.10, such as (but not limited to) comprised between 1.10 and 1.3, or 1.15 and 1.25, or between 1.19 and 1.21.

However, it should be noticed that the capsule extraction plate of the apparatus may comprise a tearing portion with a circumference which is not circular but can be squared or polygonal.

In certain non-limiting embodiments, the diameter D1 of the opening cavity is of about 34 (+/−1.5) mm.

In another aspect, the opening is configured to be substantially circular and to have a diameter D1; and the cavity is dimensioned with a maximum depth H such that the ratio of maximum depth H to the opening diameter D1 is of at least 0.9, such as (but not limited to) comprised between 0.9 and 1.2, or between 0.95 to 1.1.

The depth H of the capsule is, in certain particular (but non-limiting embodiments), comprised between 30 and 37 mm, such as (but not limited to) between 31 and 35 mm, or 34.1 (+/−1.5 mm).

In another aspect, the side wall of the capsule comprises a main, substantially truncated-cone or cylindrical shaped portion linked to the bottom wall and an enlarged base portion (also referred hereafter as "enlargement portion") ending by the internal peripheral edge; the enlarged base portion forming an enlargement of the cavity surface area in radial direction relative to the line of extension of the main truncated-cone or cylindrical shaped portion towards the tearable extraction foil member.

According to such particular design of capsule, it is surprisingly found that such capsule configuration provides improved in-cup coffee results compared to alternative configurations. Without being bound by theory, it is believed that the enlarged configuration of the capsule improves the extraction by enabling liquid to circulate differently and more freely through the coffee bed, with fewer preferred flow paths or short cuts, in its way towards the orifices created in the foil member.

More particularly, the enlarged base portion has an axial height H1 forming a ratio H1:H relative to the maximum depth H (or height) of the cavity comprised between 0.13 and 0.25, such as (but not limited to) 0.14 and 0.2, or about 0.17.

The enlargement portion of the capsule provides an increase of volume of coffee powder in the base area of the capsule adjacent the foil member. In certain non-limiting embodiments, the internal volume of the enlargement portion is between 4 and 6 ml, such as (but not limited to) between 4.5 and 5.5 ml, or of about 5 (+/−1) ml. The ratio of the internal volume 1 of the enlargement portion to the total internal volume V2 of the cavity, i.e., as delimited by the main portion of side wall and bottom wall, is (in certain non-limiting embodiments) between 0.2 and 0.3, such as (but not limited to) between 0.22 and 0.28, or about 0.25.

In certain non-limiting embodiments, the maximum depth H of the cavity is 34.1 (+/−1.5) mm, the axial height H1 of the base portion is 5.9 (+/−1.5) mm and the remaining axial height H2 of the base portion is 24 (+/−1.5) mm.

Furthermore, the bottom portion of the body forms a flat transversal surface or, alternatively, a shallow concave, e.g., truncated-cone or dome-shaped, portion.

In certain particular non-limiting embodiments, the height H3 of the bottom portion is configured such that the ratio of the height of the bottom portion to the maximum depth or height H of the cavity, H3:H is comprised between 0 and 0.2, such as (but not limited to) between 0.05 and 0.15, or between 0.1 and 0.13.

The tearable extraction foil member may be a plain (i.e., without pre-made apertures) membrane made of aluminium and/or polymer.

Composite may also be employed for the foil member, and such include, but are not limited to, for example, aluminium/polymer, aluminium/polymer/paper, polymer laminates. The polymers can include but are not limited to polyethylene, polypropylene, PET, acrylics and the like. Thickness of the foil member may be dependent upon the breaking stress and may range from such as from about 5 microns to about 120 microns.

In a possible alternative, the tearable extraction foil member is a stretchable polymer foil member comprising exit through-openings of predetermined diameter, e.g., 70-150 openings; of small enough diameter to retain the roast and ground coffee in the cavity but which when submitted to the fluid pressure in the extraction chamber individually enlarge, under the effect of pressure and heat, against the tearing portion of the extraction plate, to form the coffee flow orifices. The foil member may, for instance, be a bi-layer of PET and PP. For the foil member to form the drain orifices, the thickness should, in certain non-limiting embodiments, be relatively thin, such as between 20 and 50 microns.

In a particular (but non-limiting) aspect, the tearable extraction foil member may be formed of a foil of aluminium of thickness (measured before eventual embossing) comprised between 20 and 50 µm, such as (but not limited to) about 40 (+/−5) µm. Such foil member generally tears or perforates against the extraction plate when a sufficient pressure of liquid is attained in the liquid injection means of the device, for example, a liquid pressure of from about 7 and 10 bar (pressure measured in the fluid circuit upstream the extraction chamber).

In a possible aspect, the cavity of the body is free of any additional filter layer adjacent or close to the foil member.

In an alternative, the cavity of the body comprises an additional filter layer adjacent or close to the foil member such as described in WO 2009/112291.

In a first mode of the coffee capsule of the presently disclosed and/or claimed inventive concept(s) the lid comprises a flexible tearable foil member which is sealed onto the flange of the capsule. In particular, the lid is fully formed by the foil member.

In a second mode of the coffee capsule of the presently disclosed and/or claimed inventive concept(s), the lid comprises an annular outer plain (i.e., non-apertured or with no premade through-holes present) wall portion forming a central opening and a central flexible tearable extraction foil member, covering the central opening, which is made of more flexible material than the material of the annular wall portion.

In particular, the central opening, as delimited by the annular wall, has an opening surface area A3, measured at said innermost peripheral edge, such that the ratio of the opening surface area A1 of the cavity opening relative to the opening surface area A3 of the central opening, which is at least of 2.0, such as (but not limited to) comprised between 2.1 and 2.5, or between 2.2 and 2.4, or about 2.3.

The tearable extraction foil member can be sealed onto the internal surface of the annular wall portion or alternatively onto the external surface of the annular wall portion.

Another non-limiting embodiment of the presently disclosed and/or claimed inventive concept(s) is also a single-use coffee capsule with a tearable extraction foil member for the preparation of a liquid coffee extract in an coffee preparation apparatus comprising an extraction unit comprising an extraction chamber formed by the arrangement of a water injection cage for injecting water in the capsule and a capsule extraction plate comprising a tearing portion with a plurality of tearing members for creating coffee flow orifices in the extraction foil member under the effect of the pressure of fluid in the capsule;

said capsule comprising:
  a cup-shaped body comprising a cavity containing a predetermined amount of roast and ground coffee; said cavity being defined by a bottom wall and a substantially tubular side wall; the side wall ending by a cavity opening delimited by an internal peripheral edge of the side wall in the direction opposed to the bottom wall,
  an annular flange extending outwardly from the said internal edge of the side wall, and
  a lid covering the opening being at least partially formed by the tearable extraction foil member; wherein
  the cavity of the capsule contains at least 6.9 grams of roast and ground coffee, such as (but not limited to) of from 7.0 to 12.0 grams of roast and ground coffee and,
  the side wall comprises a main, substantially truncated-cone or cylindrically shaped portion linked to the bottom wall and an enlarged base portion ending by the internal peripheral edge; the enlarged base portion forming an enlargement of the cavity surface area in radial direction (R) relative to the line of extension (I) of the main substantially truncated-cone or cylindrical shaped portion, towards the extraction foil member.

In certain particular non-limiting embodiments, the enlarged base portion forms a curved step.

In certain particular non-limiting embodiments, the enlarged base portion has a height (H1) comprised between 3.0 and 6.5 mm, such as (but not limited to) between 4.5 and 6.0 mm.

In certain particular non-limiting embodiments, the maximum depth H of the cavity is 34.1 (+/−1.5) mm, the axial height H1 of the enlarged base portion is 5.9 (+/−1.5) mm and the axial height H2 of the main portion is 24 (+/−1.5) mm.

The presently disclosed and/or claimed inventive concept(s) further relates to a system for producing a liquid coffee extract comprising:
  a single-use capsule as described before and,
  a coffee preparation apparatus comprising an extraction unit comprising:
    an extraction chamber for receiving the capsule,
    a water injection cage for injecting water inside the cavity of the capsule,
    a capsule extraction plate for creating coffee flow orifices in the tearable extraction foil member of the capsule;
wherein said extraction plate comprises an inner tearing portion of diameter A2 formed by a plurality of tearing members in relief and a network of flow channels in recess separating the tearing members, and an outer portion extending about the inner tearing portion and forming a relatively smooth, non-tearing receiving surface for receiving at least an annular portion of said foil member.

The presently disclosed and/or claimed inventive concept(s) further relates to the use of the capsule for the coffee preparation apparatus to prepare a liquid coffee extract.

In a first mode, the presently disclosed and/or claimed inventive concept(s) relates to a single-use capsule and capsule system as well. A capsule according to the presently disclosed and/or claimed inventive concept(s) is illustrated in FIGS. 1 to 4.

The capsule 1 of the presently disclosed and/or claimed inventive concept(s) generally comprises a cup-shaped body 2 and a lid 3. In this first mode, the lid is entirely formed by a tearable extraction foil member 10. By "tearable" it is essentially meant that the foil member is configured to tear, puncture or stretch against an extraction plate of the apparatus by deforming and tearing or perforating a plain wall or enlarging the opening surface area of premade through-openings by stretching, under the effect of the pressure of several bar of liquid or a mixture of liquid and gas in the capsule to form a plurality of drain orifices in the foil member.

The cup-shaped body has a bottom wall 4 and a side wall 5. The bottom wall and side wall define together a cavity 6 receiving a predetermined amount of coffee. In certain non-limiting embodiments, coffee is essentially roast and ground coffee powder. By "essentially" it is meant that coffee may also be a mixture of roast and ground coffee and one or more additional ingredients such as instant coffee, flavour compounds, grains, seeds, sweeteners, in minor proportion (less than 10 wt. % of the total coffee weight). The body may further comprise an annular flange 7 that extends outwardly beyond the side wall and from a cavity opening 8. The cavity opening is generally demarcated by an internal peripheral edge 9 forming the junction between the side wall 5 and the flange 7.

In certain non-limiting embodiments, the cavity may be closed by the tearable extraction foil member 10. The foil member is configured to be torn by effect of the pressure rising inside the capsule before extraction in a dedicated coffee preparation apparatus. The foil member thereby covers the opening 8 and is also, in certain non-limiting embodiments, sealed onto the flange. The foil is, in certain non-limiting embodiments, a plain (i.e., without pre-made apertures) membrane made of aluminium and/or polymer. Composite may also be employed for the foil member, and such include, but are not limited to, for example, aluminium/polymer, aluminium/polymer/paper, polymer laminates. The polymers can include but are not limited to polyethylene, polypropylene, PET, acrylics and the like. Thickness of the foil member may be dependent upon the breaking stress and may range from such as from about 5 microns to about 120 microns. The foil member can be covered internally by a sealant such as a polymer film or a lacquer for being sealed to the flange. Sealing of the foil member to the flange can be obtained by any suitable means such as heat or ultrasonic welding.

Figure 3:
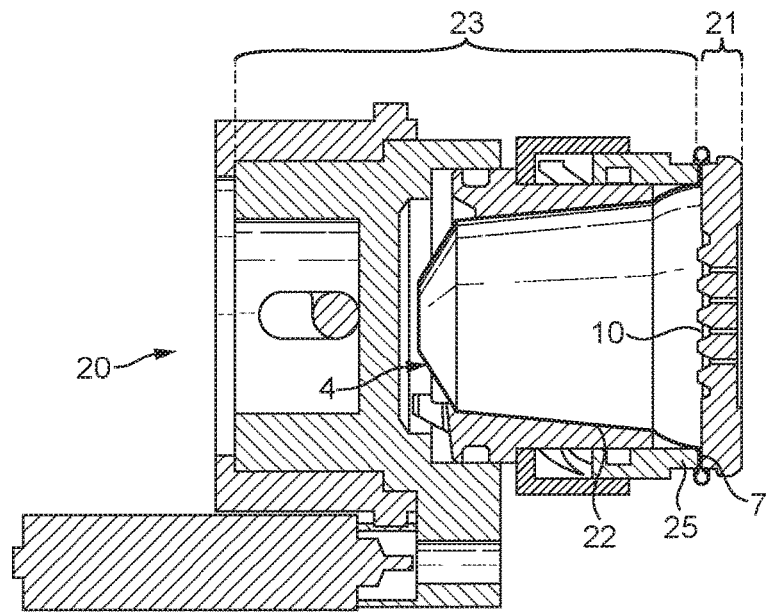
FIG. 3 is a cross-sectional view of the capsule of the presently disclosed and/or claimed inventive concept(s) inserted in an extraction chamber of a coffee beverage apparatus in closed configuration.

As shown in FIG. 3 more particularly, the foil member is generally configured to tear (or perforate) against an extraction plate 21 of the extraction unit 20 of a coffee preparation apparatus (not fully represented). The coffee extraction unit generally comprises an extraction chamber 22 for receiving the capsule, a water injection cage 23 for injecting water inside the cavity of the capsule and an extraction plate 21 for creating multiple flow orifices in the foil member 10 of the capsule for draining coffee out. The water injection cage 23 usually covers the body of the capsule. It has an annular pressing edge 25 for pressing onto the flange 7 and creates with it a water-tight arrangement under the pressure of water in the chamber. The injection cage may comprise perforating members such as blades or needles (not illustrated) to perforate the bottom wall 4 of the capsule for enabling the extracting liquid, such as (but not limited to) hot water, to enter the capsule.

Figure 4:
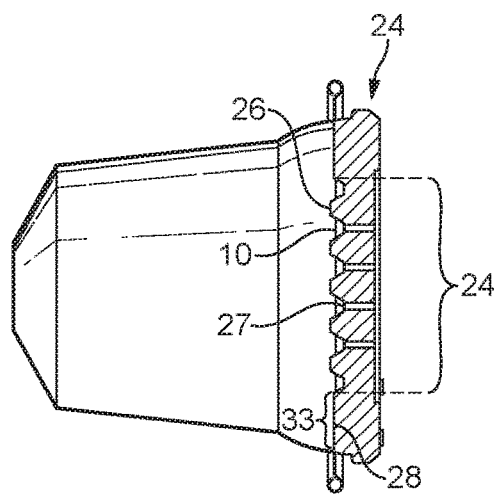
FIG. 4 is a cross-sectional view of the capsule of the presently disclosed and/or claimed inventive concept(s) along a median longitudinal plan of the presently disclosed and/or claimed inventive concept(s) when engaged by an extraction plate with reduced tearing surface area of the apparatus (referred hereafter as "Small" extraction plate).
Figure 5:
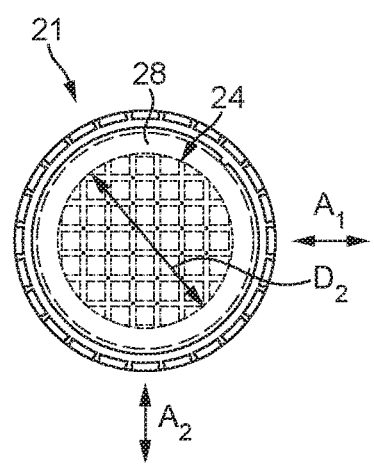
FIG. 5 is a planar view of the "Small" extraction plate of the apparatus.
Figure 10:
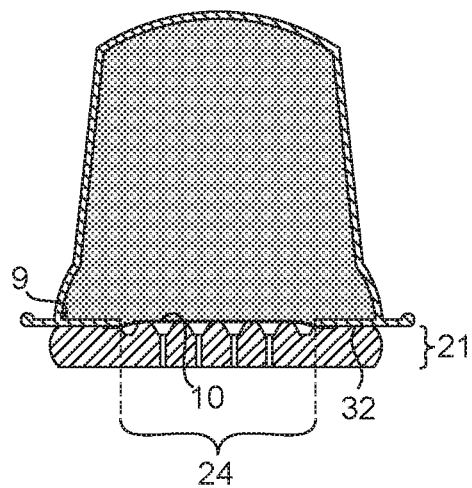
FIG. 10 is a cross-sectional view of the capsule of the presently disclosed and/or claimed inventive concept(s) according to the second mode along the median longitudinal plan of the presently disclosed and/or claimed inventive concept(s) when engaged by a "Small" extraction plate of the apparatus.

As this is visible in FIGS. 4 and 5, the extraction plate 21 comprises an inner tearing portion 24 onto which the foil member 10 can engage when the extraction chamber is closed. The inner tearing portion, as know 'per se' comprises a series of tearing members, such as (but not limited to) truncated pyramids 26 or a similar tearing structure separated by a network of flow channels 27. The truncated pyramids can have a quadrilateral base and a truncated pyramidal longitudinal cross-section with a flattened top surface as shown in FIGS. 5c and 5d of EP0512470B1. The side surfaces of the tearing members may be rectilinear or slightly rounded (FIG. 5c). The pyramids may comprise two stages with a lower base forming a truncated pyramid and an upper base forming a truncated pyramid such as shown in FIG. 10 of EP0512470B1. A similar tearing structure to a truncated pyramidal structure may be formed by other different shapes such as rounded elements shown in FIGS. 5a, 5b of EP0512470B1. The tearing members are separated by channels 27 forming a network for collecting and distributing the coffee extract. The channels are thereby in recess relative to the tearing members or extraction chamber. The truncated pyramids or other similar tearing members are arranged in arrays and are generally directed along two directions which are orthogonal to each other. The number and size of the tearing members can be variable. In certain non-limiting embodiments, the number of the tearing members is comprised between 30 and 40. For example, the width of the channels between two adjacent pyramids is, in certain non-limiting embodiments, between 1 and 2 mm. Inside the channels are provided through-holes for draining the coffee extract from the chamber through the plate. The number of through-holes can be between 10 and 35. The diameter of the through-holes can vary but is, in certain non-limiting embodiments, between 0.1 and 0.4 millimeter. Around the inner tearing portion is generally provided an outer relatively smooth, non-tearing receiving surface portion 28 for receiving an annular portion of the foil member. On the edge of the inner tearing portion, the tearing members (pyramids) can be partially formed to merge with the non-tearing surface portion 28.

According to an aspect of the presently disclosed and/or claimed inventive concept(s), the capsule of the presently disclosed and/or claimed inventive concept(s) is dimensioned with an internal volume comprised between 17 and 31 ml, such as (but not limited to) between 18 and 28 ml, or 20 (+/−3) ml. This volume is larger than for existing capsules, normally, of about 14.5 ml and thereby enables to fill a larger amount of roasted coffee powder than for existing capsule. In particular, the amount of roast and ground coffee stored in the capsule is at least 6.9 grams, such as (but not limited to) from 7.0 to 12.0 grams, or from 7.5 grams to 10.5 grams. In particular, with such amount of coffee powder and with the configuration of the capsule, coffee intensity of the extract can be increased significantly compared to the existing capsule and also more complex flavour modulation can be obtained.

Figure 2:
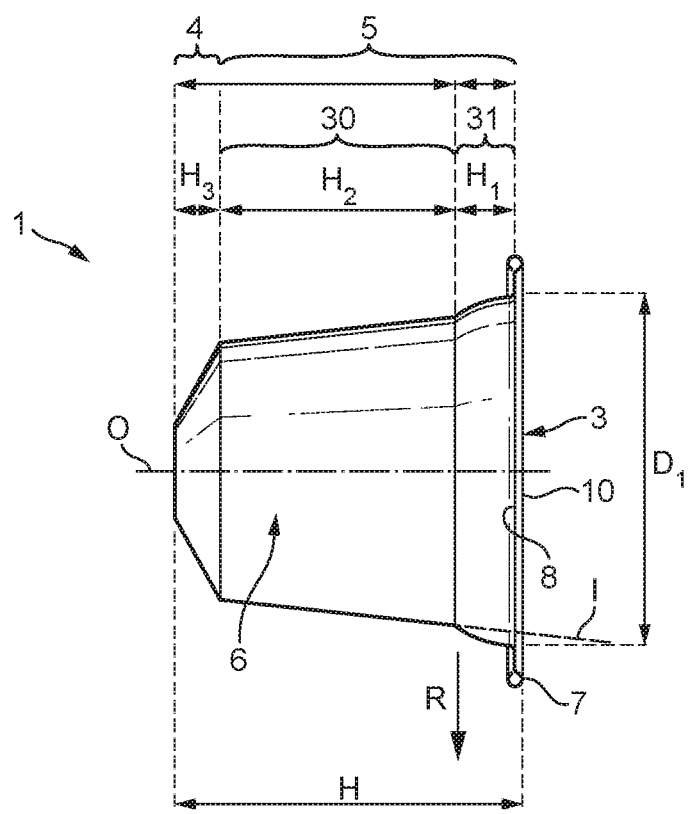
FIG. 2 is a cross-sectional view along a median longitudinal plane of the capsule of FIG. 1.

According to an aspect of the presently disclosed and/or claimed inventive concept(s), the capsule is designed to provide an enlarged cavity opening 8 compared to the existing capsule. In certain non-limiting embodiments, this enlarged cavity opening may be obtained by an enlargement provided locally in the base portion of the side wall 2, as illustrated in FIGS. 1 and 2. At the same time, the capsule depth H, i.e., the axial height of the cavity is generally longer (e.g., about 20% longer) than the one of the existing capsule.

More particularly, the side wall 5 comprises a main truncated-cone or cylindrically shaped portion 30 linked, at one end, to the bottom wall 4 and, at opposite end, to second enlarged base portion 31 ending by the internal peripheral edge 9. This base portion 31 thereby forms an enlargement of the cavity surface area adjacent the foil member 10, in radial direction R relative to the line of extension I of the conical or tubular portion towards the extraction foil member (FIG. 2).

The main portion 30 can be truncated in a continuous manner or stepwise (e.g., by a succession of steps forming an overall truncated shape). The portion 30 may as well be, in axial direction, formed by a succession of truncated-cone or cylindrically shaped parts.

The enlarged base portion 31 may extend in the axial direction O as a convex line (in view from the outwards) or extend by a succession of a convex line(s) and rectilinear line(s). As a result of such enlargement, the surface area of the cavity opening 8 is significantly increased.

According to the presently disclosed and/or claimed inventive concept(s), it was found important to determine the ratio of the opening surface area A1 of the cavity opening 8 to the tearing portion area A2 of the extraction plate. This ratio A1:A2 was found important to ensure improved extraction results, in particular, limiting the extraction of certain undesired coffee compounds. Such extraction of compounds appears to be dependent on the geometry/dimensions of the capsule relative to the apparatus. In certain non-limiting embodiments, we found that the desired (but non-limiting) ratio A1:A2 is comprised between 2.1 and 2.5, such as (but not limited to) between 2.2 and 2.4, or about 2.3. When the ratio A1:A2 is below 2.0, such as 1.8, it was found that the level of coffee oil, as an indicator of the increase of undesired coffee compounds, for a large-volume capsule may increase by more than 25% and up to more than 80%.

In other words, in certain non-limiting embodiments, it may be desirable to maintain the surface area of the tearing portion 24 of the extraction plate low compared to the surface area of the tearable extraction foil member. Only a (central) part of the foil member covering the opening is thus torn while a peripheral portion of the membrane remains closed. It is supposed that the enlargement associated to the control of the tearing surface area of the foil member enables liquid to circulate more freely through the coffee bed, with fewer preferred flow paths or short cuts, in its way towards the orifices created in the foil member.

Further according to a particular (but non-limiting) mode of the presently disclosed and/or claimed inventive concept(s), the opening 8 is substantially circular at its edge 9. The outer limit of the tearing portion 24 of the extraction plate is also, in certain non-limiting embodiments, circular. Therefore, a particular (but non-limiting) ratio can also be expressed as: the ratio of the opening cavity diameter D1 relative to a circular tearing portion of the diameter D2 capsule extraction plate, i.e., D1:D2, is at least of 1.10, such as (but not limited to) comprised between 1.10 and 1.3, or between 1.15 and 1.25, or between 1.19 and 1.21. In a particular (but non-limiting) embodiment, the diameter of the opening is of about 34 (+/−1.5 mm).

In addition, in order for the capsule to be deep enough for receiving a sufficient amount of coffee powder, i.e., at least 6.9 grams, the relation between the diameter D1 and the maximum depth H is, in certain non-limiting embodiments, such that the ratio of maximum depth H to said opening diameter D1 is of at least 0.9, such as (but not limited to) comprised between 0.9 and 1.2, or 0.95 to 1.1.

Furthermore, the dimensional relation of the enlarged base portion with the dimension of the cavity is, in certain non-limiting embodiments, to be respected such that the ratio of the axial height H1 of the enlarged base portion 31 relative to the maximum depth H of the cavity 6, H1:H, is comprised between 0.13 and 0.2, such as (but not limited to) between 0.14 and 0.18, or of about 0.17.

In a specific mode of the presently disclosed and/or claimed inventive concept(s), the maximum depth H of the cavity is 34.1 (+/−1.5) mm, the axial height H1 of the base portion is 5.9 (+/−1.5) mm and the axial height H2 of the main portion of sidewall is 24 (+/−1.5) mm.

The bottom portion 4 of the capsule of the presently disclosed and/or claimed inventive concept(s) may form a flat transversal surface or a shallow concave volume. The bottom portion can take, for instance, the form of a short trunk of cone or dome. It can be closed or may alternatively be provided with inlet opening(s). The portion may also comprise one or more zones which are convex (from the point of view of the cavity, i.e., protruding internally towards the cavity).

In another particular (but non-limiting) mode, the extraction wall is formed of a foil of aluminium of (flat) thickness comprised between 20 and 50 μm, such as (but not limited to) about 40 (+/−5) μm. The foil may be embossed by a microstructure and/or lettering. The thickness here refers to the foil before embossing.

The cavity may be free of any additional filter layer adjacent or close to the foil member. However, an additional filter layer can be placed adjacent the inner surface of the foil or be placed inwardly distant from the foil such as to serve as a trap for certain undesired coffee compounds.

Figure 9:
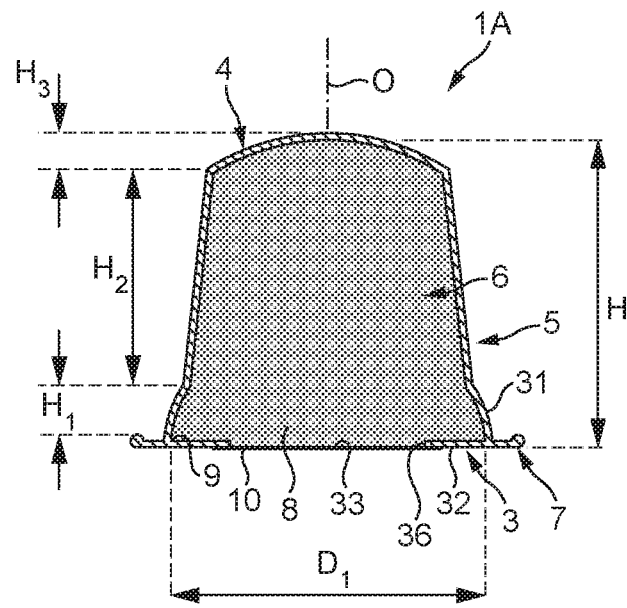
FIG. 9 is a cross-sectional view of a capsule according to a second mode of the presently disclosed and/or claimed inventive concept(s).

A second possible mode of the capsule and system of the presently disclosed and/or claimed inventive concept(s) is illustrated in FIGS. 9 and 10.

In this mode, the capsule 1A comprises a body with a bottom wall 4 and a side wall 5. The side wall 5 comprises an enlarged base portion 31 as described earlier.

The relative dimensions (H, H1, H2, H3, D1, D2) and associated ratios described in relation to the previous mode are applicable for this case as well as for the next embodiment.

As a noticeable difference with the previous mode, the lid 3 comprises an annular non-apertured or plain wall 32 delimiting a central opening 33 covered by a central flexible tearable foil member 10 which is made of more flexible material than the material of the annular wall 32.

The cavity 6 delimited by the side wall 5 thus comprises a larger opening 8 delimited by the internal edge 9 which is partially covered by the annular portion of wall 32 and partially covered by the flexible tearable foil member 10.

A flange 7 is also present which can be an integral part of the side wall and/or annular wall 32.

The body and/or lid of the capsule can be formed of: metal, polymer such as polypropylene, starch-based material (PLA-starch compounds) or combinations thereof.

The flexible foil can be formed (as described generally or specifically for the preceding mode) of aluminium and/or thin polymer.

The foil can be sealed onto the external surface of the annular portion of wall 32 and/or flange 7.

As illustrated in FIG. 10, when the capsule is inserted in the extraction unit of the beverage apparatus, the lid 3 is arranged to contact the extraction plate 21 in such a manner that the central opening 33 substantially matches with the tearing portion 24. As a result, the foil member 10 covers the tearing portion 24 and is prone to tearing under the effect of pressure building in the capsule during coffee extraction.

It should be noted that the central opening 33 can have a slightly higher surface area and/or diameter than, respectively, the surface area and diameter of the tearing portion 24 of the extraction plate.

In a possible aspect, the central opening 33 is arranged to have an opening surface area A3, measured at said innermost peripheral edge 36, such that the ratio of the opening surface area A1 of the cavity opening 8 relative to the opening surface area A3 of the central opening 33, is at least of 2.0, such as (but not limited to) comprised between 2.1 and 2.5, or 2.2 and 2.4, or about 2.3.

Figure 11:
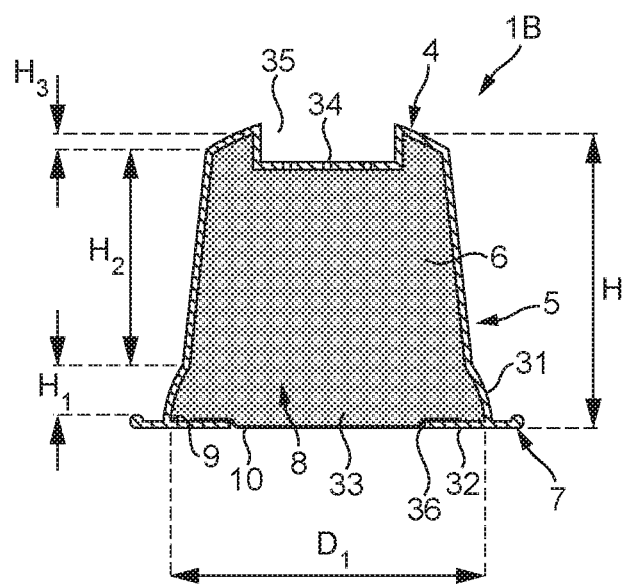
FIG. 11 is a cross-sectional view of a capsule according to a third mode of the presently disclosed and/or claimed inventive concept(s).
Figure 12:
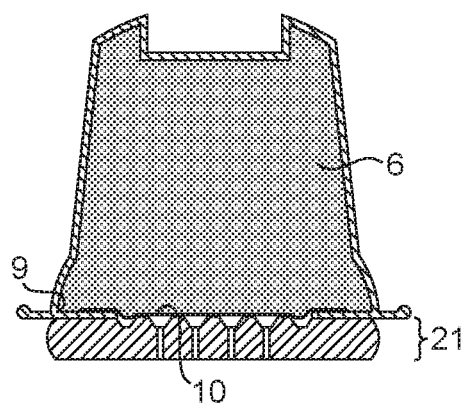
FIG. 12 is a cross-sectional view of the capsule of the presently disclosed and/or claimed inventive concept(s) according to the third mode along the median longitudinal plan of the presently disclosed and/or claimed inventive concept(s) when engaged by a "Small" extraction plate of the apparatus.

A third mode of the capsule of the presently disclosed and/or claimed inventive concept(s) is illustrated in FIGS. 11 and 12. The capsule 1B differs from the previous mode of capsule 1A in that the flexible extraction foil member 10 is sealed onto the internal surface of the annular portion of wall 32 and/or flange 7. Another difference can be that the bottom 4 of the capsule 1B comprises inlet apertures 34 and/or a large recess 35 oriented inwards the cavity 6. The recess can be dimensioned sufficiently large and deep to be able to house the perforating elements (e.g., blades) of the water injection means without perforation of the bottom wall of the capsule. The recess could be further covered with a top perforable membrane sealed on the bottom 4. Of course, these differences are transposable individually or in any possible combinations to capsule 1 or 1A.

EXAMPLES

All extraction tests were performed using a Nespresso Citiz® fluid system. As a matter of example, the dosage of coffee oil in the liquid coffee extract was used as a mere indicator of the extraction of undesired compounds ("referred thereafter as "EI" or extraction indicator).

The dosage of the coffee oil used a near infra-red method measuring the absorption by molecular bond of electromagnetic radiation between 700-2500 nm. The method uses a FOSS XDS instrument and a spectra recording software (ISISscan NIR) supplied by Gerber Instruments AG. The measurement was performed on the pooled extract of 30 capsules extracted on the same apparatus over a same extraction series. The coffee extract is measured after it has reached room temperature.

Example 1

Dimensions of Capsules and Extraction Plate

For comparison, three different types of capsules were built and tested, respectively A, B and C capsules.

Capsule A was a prior art commercial Nespresso® capsule, referred as "Short" capsule of low volume and without enlargement.

Capsule B was an alternative large-volume capsule illustrated in FIG. 8 referred as "Narrow". The capsule has no enlargement base portion but a continuous trunk-shaped side wall and with longer depth and more coffee ingredient than capsule A.

Capsule C was the capsule of the presently disclosed and/or claimed inventive concept(s) illustrated in FIGS. 1, 2 and 6, referred as "Large" with an enlarged base portion 31 and larger opening surface area compared to the one of capsule A or B.

All capsules had a foil member made of aluminium with a (flat) thickness of about 40 µm.

| Capsule | Cavity Volume (ml) | Opening diameter D1 (mm) | Depth H (mm) | Enlargement H1 (mm) |
|---|---|---|---|---|
| A Short | 14.5 | 30 | 28 | 0 |
| B Narrow | 19.4 | 30 | 37.7 | 0 |
| C Large | 19.4 | 34 | 34.1 | 5.9 |

Example 2

In-cup Coffee Averaged Results for B (Narrow) Capsule Versus C (Large) Capsule

Short volumes of 25-ml of coffee were extracted in a coffee preparation apparatus from respectively B (Narrow) capsules and C (Large) capsules. For comparative reasons, the extraction plate was dimensioned with a tearing portion 24 having a diameter of 28 mm for both systems. Therefore, the ratio A1:A2 for the B (Narrow) capsule was about 1.8 and its ratio D1:D2 was about 1.07. The ratio for the C capsule was about 2.3 and its ratio D1:D2 was about 1.2.

The blend R1 was made of roast and ground coffee having a mean diameter $D_{4,3}$ of 275 µm.

The in-cup coffee results for different coffee weights are collected in the following table (results of C capsule in parenthesis).

| Coffee extract of 25 ml | Blend | Coffee weight (g) | Total solids (wt. %) | Flow time (s) | Average EI vs. Reference C (Ref) |
|---|---|---|---|---|---|
| B/(C) | R1 | 7 | 5.9/(5.8) | 17/(17) | +76%/(Ref) |
| | | 7.5 | 6.8/(6.1) | 17/(17) | +61%/(Ref) |
| | | 8.0 | 7.2/(6.7) | 20.5/(17) | +63%/(Ref) |
| | | 8.5 | 8.2/(7.2) | 26/(18.5) | +30%/(Ref) |

Surprisingly, the C (Large) capsule is significantly lower for the extraction indicator (IU) than the B capsule. Coffee extraction flow was also faster for capsule C at higher coffee weight.

In sensory tests, the two coffee extracts extracted from the capsules were close in intensity regarding the overall flavor and roasty flavour.

Example 3

In-cup Coffee Averaged Results for C (Large) Capsule

Short volumes of 25-ml of coffee were extracted in a coffee preparation apparatus from C (Large) capsule.

For comparison, two sorts of extraction plates were tested. A first extraction plate had a tearing portion of 28 mm. It is referred as the "Small extraction plate" and a second extraction plate had a tearing portion of 32 mm. It is referred as the "Large extraction plate".

For "Small" extraction plate, the ratio A1:A2 was 2.3 and the ratio D1:D2 was 1.2.

For the "Large" extraction plate, the ratio A1:A2 was 1.8 and the ratio D1:D2 was 1.06.

The blend R2 was made of roast and ground coffee having a mean diameter $D_{4,3}$ of 390 µm.

The blend K1 was made of roast and ground coffee comprising having a mean diameter $D_{4,3}$ of 275 µm.

The data and results for two different blends R2 (same as for examples 2 and 3) and K1 are compiled in the following table (results for C capsule are reported in parenthesis).

| Coffee blend | Extraction Plate | Flow time (s) | Tc (% wt.) | Yield (% wt.) | Average EI vs. Reference C (Ref. 1 or Ref. 2) |
|---|---|---|---|---|---|
| R2 | Small | 12.3 | 7.3 | 20.9 | Ref. 1 |
|  | Large | 10.2 | 6.6 | 20.8 | +80%/Ref. 1 |
| K1 | Small | 18.0 | 8.0 | 24.5 | Ref. 2 |
|  | Large | 13.3 | 7.6 | 24.0 | +28%/Ref. 2 |

Surprisingly, the C capsule with the tearing portion of smaller diameter (Small extraction plate) has a significantly lower level of extraction indicator (EI).

Example 4

In-cup Coffee Averaged Results for Prior Art (Short) Capsule and Capsule C (Large)

Short volumes of 25-ml of coffee were extracted in a coffee preparation apparatus from A (Short) capsules and C (Large) capsules.

For comparative reasons, the extraction plate was dimensioned with a tearing portion 24 having a same diameter D2 of 28 mm for both systems The results are compiled below for blend R1.

| Capsule | Coffee weight (g) | Total solids (wt %) | Yield (wt. %) |
|---|---|---|---|
| Short A | 6.0 | 5.2 | 23.0 |
| Large C | 8.0 | 6.6 | 22.0 |

On sensory test, the coffee extract dispensed from capsule C (Large) was perceived comparatively to capsule A as follows:

Appearance: darker crema colour;
Aroma: more intense;
Flavour: more intense, bitter, more roasty, no off-flavours;
Texture: more body.

The invention claimed is:

1. A system for producing a liquid coffee extract, comprising:
a single-use capsule with a tearable extraction foil member for the preparation of a liquid coffee extract, said capsule comprising:
a cup-shaped body comprising a cavity containing a predetermined amount of roast and ground coffee, said cavity defined by a bottom wall and a substantially tubular side wall, the side wall comprising a main, truncated-cone or cylindrical shaped portion connected to the bottom wall and an enlarged, base portion connected to an internal peripheral edge of the main, truncated-cone or cylindrical shaped portion, wherein the enlarged, base portion comprises a larger surface area of the cavity than the main, truncated-cone or cylindrical shaped portion and forms an enlargement of the surface area of the cavity of the main, truncated-cone or cylindrical shaped portion in a radial direction relative to a line of extension of the main, truncated-cone or cylindrical shaped portion, the enlarged base portion comprising an internal peripheral edge of the base portion positioned on an end of the enlarged base portion opposite to the bottom wall, the internal peripheral edge of the base portion defining an opening;
an annular flange extending outwardly in the radial direction from the internal peripheral edge, and
a lid covering the opening, the lid at least partially formed by the tearable extraction foil member;
wherein the cavity of the capsule contains at least 6.9 grams of roast and ground coffee; and
wherein the opening is arranged to have an opening surface area A1 measured at the internal peripheral edge of the base portion; and
a coffee preparation apparatus for preparing the liquid coffee extract from the capsule, the coffee preparation apparatus comprising an extraction unit comprising:
an extraction chamber for receiving the capsule;
a water injection cage for injecting water inside the cavity of the capsule;
a capsule extraction plate for creating coffee flow orifices in the tearable extraction foil member of the capsule under an effect of a pressure of fluid in the capsule;
wherein the extraction chamber is formed by an arrangement of the water injection cage and the capsule extraction plate;
wherein the capsule extraction plate comprises an inner tearing portion diameter of a tearing portion surface area A2 formed by a plurality of tearing members in relief and a network of flow channels in recess separating the plurality of tearing members, and an outer portion extending about the inner tearing portion and forming a relatively smooth, non-tearing receiving surface for receiving an annular portion of the tearable extraction foil member; and
wherein a ratio of A1 relative to A2 is at least 2.0.

2. The system according to claim 1, wherein the opening comprises a substantially circular outer limit and comprises a diameter D1, wherein the tearing portion comprises a diameter D2, and the ratio D1:D2 is at least of 1.10.

3. The system according to claim 2, wherein D1 is about 34(+/−1.5) mm.

4. The system according to claim 1, wherein the capsule comprises an internal volume between 17 and 31 ml.

5. The system according to claim 1, wherein the opening comprises a substantially circular outer limit, an opening diameter D1, and a maximum depth of the cavity H along a midline of the substantially tubular side wall, wherein a ratio of H to the opening diameter D1 is at least 0.9.

6. The system according to claim 5, wherein the enlarged base portion of the capsule comprises an axial height H1 along a midline of the substantially tubular side wall forming a ratio H1:H between 0.13 and 0.25.

7. The system according to claim 6, wherein a height H3 of the bottom wall along a midline of the substantially tubular side wall is configured such that a ratio of H3:H is between 0 and 0.2.

8. The system according to claim 6, wherein H is 34.1 (+/−1.5) mm, H1 is 5.9(+/−1.5) mm, and H2 is 24(+/−1.5) mm.

9. The system according to claim 1, wherein the bottom wall forms a flat transversal surface or a shallow concave volume in the cavity.

10. The system according to claim 1, wherein the lid comprises a flexible tearable foil member which is sealed onto the annular flange.

11. The system according to claim 1, wherein the lid of the capsule comprises an annular outer plain wall portion forming a central opening and a central flexible tearable foil member, the foil member covering the central opening and comprises a more flexible material than a material of the annular wall portion.

12. The system according to claim 1, wherein the tearable extraction foil member comprises a foil of aluminium comprising a thickness between 20 and 50 μm.

13. The system according to claim 1, wherein the cavity is free of any additional filter layer adjacent or close to the foil member.

14. The system according to claim 1, wherein the cavity comprises an additional filter layer adjacent or close to the foil member.

15. A method, comprising the step of:
producing a liquid coffee extract using the system of claim 1.

16. The system of claim 1, wherein the cavity contains from 7.0 to 12.0 grams of roast and ground coffee.

17. The system of claim 1, wherein the ratio of A1 to A2 is between 2.1 and 2.5.

18. The system of claim 1, wherein the enlarged, base portion comprises a larger cross-sectional area in a plane perpendicular to a midline of the substantially tubular sidewall than a cross-sectional area of the main, truncated-cone or cylindrical shaped portion in another plane perpendicular to the midline.

19. The system of claim 18, wherein the enlarged, base portion extends from the midline of the substantially tubular sidewall such that the substantially tubular sidewall forms a convex line in the enlarged, base portion when viewed in a cross-sectional plane parallel to the midline.

\* \* \* \* \*